July 17, 1962 W. SHOCKLEY 3,044,909

SEMICONDUCTIVE WAFER AND METHOD OF MAKING THE SAME

Filed Oct. 23, 1958 2 Sheets-Sheet 1

WILLIAM SHOCKLEY
INVENTOR.

BY Flehr and Swain

ATTORNEYS

July 17, 1962 W. SHOCKLEY 3,044,909

SEMICONDUCTIVE WAFER AND METHOD OF MAKING THE SAME

Filed Oct. 23, 1958 2 Sheets-Sheet 2

WILLIAM SHOCKLEY
INVENTOR.

BY Flehr and Swain

ATTORNEYS

United States Patent Office 3,044,909
Patented July 17, 1962

3,044,909

SEMICONDUCTIVE WAFER AND METHOD OF MAKING THE SAME

William Shockley, 23466 Corta Via, Los Altos, Calif.

Filed Oct. 23, 1958, Ser. No. 769,227
7 Claims. (Cl. 148—1.5)

This invention relates to a semiconductive wafer and method for making the same.

It is a general object of the present invention to provide a semiconductive wafer suitable for the fabrication of high frequency devices.

It is another object of the present invention to provide a wafer of semiconductive material which includes closely spaced holes extending therethrough.

It is a further object of the present invention to provide a method for forming a wafer of the above character.

These and other objects of the invention will become more clearly apparent from the following description when taken in conjunction with the accompanying drawing.

Referring to the drawing.

Figure 1:
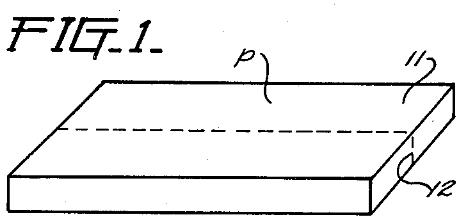
FIGURE 1 is a perspective view of a wafer of semiconductive material including a grain or twin boundary.

The wafer 11, FIGURE 1, includes a grain or twin boundary 12. A plurality of wafers 11 can be made by dicing a grown crystal having one or more boundaries 12. Crystals including grain or twin boundaries may be formed by properly seeding the crystal during the growing process. For example, a seed having two or more properly cut and oriented parts may be employed. Methods of growing crystals including grain or twin boundaries will be presently described.

The wafer 11 including a boundary 12 is placed in an etching solution. The etchant will act more rapidly along the dislocations located at the boundary. Thus, when the wafer is allowed to remain in the etching solution for a prolonged period of time, deep pits will be formed along the dislocations. After sufficient time has elapsed the pits will join to form holes which extend through the wafer. The spacing of the holes is controlled by the spacing of the dislocations which, in turn, can be controlled in the crystal growing process. The holes may be spaced as close as a few microns apart. Common etches for this purpose may consist of combinations of hydrochloric and nitric acids. Many other common combinations of active acids and bases are suitable for carrying out the etching operation. Electrolytic etching may also be employed.

Figure 3:
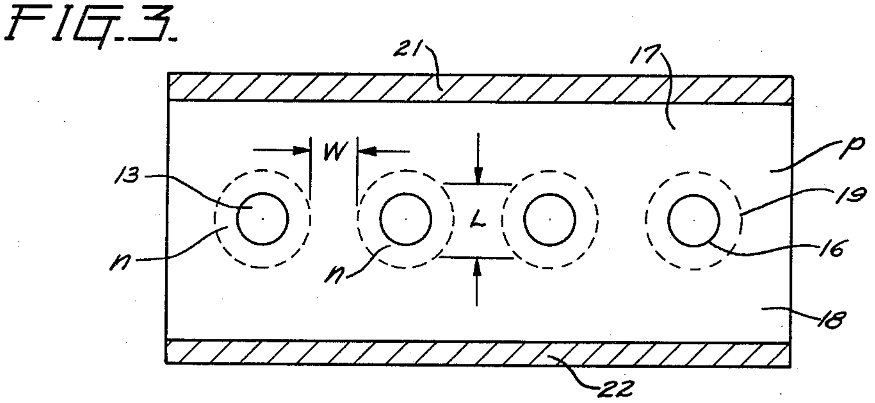
FIGURE 3 shows a field effect or unipolar transistor formed by diffusing impurities into the wafer of FIGURE 1.

The holes have been represented as being of uniform diameter as they passed through the slice. In most etching operations, the holes will be somewhat enlarged at the ends and narrower in the center of the region. It is evident that this will affect design considerations in calculating the actual size of the channels in a field effect structure like FIGURE 3, to be presently described, or the distribution of thickness in the base layer of the junction configuration of FIGURE 5, to be presently described. However, this variation does not affect in a significant way the basic behavior of the device.

Thus, a wafer is formed which includes a plurality of spaced holes extending through the same. Each of these holes is encircled by a Burgers circuit which has non-vanishing "Burgers vector." For a description of Burgers circuits and vectors, see chapter 2 of Imperfections in Nearly Perfect Crystals, a symposium sponsored by the Committee on Solids. Division of Physical Sciences, National Research Council, W. Shockley, Chairman Editorial Committee. Published by John Wiley & Sons, Inc., copyright 1952.

Figure 2:
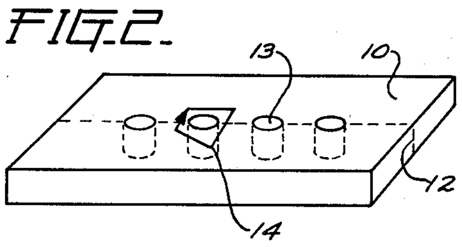
FIGURE 2 shows the wafer of FIGURE 1 after it has been subjected to a prolonged etching operation.
Figure 4:
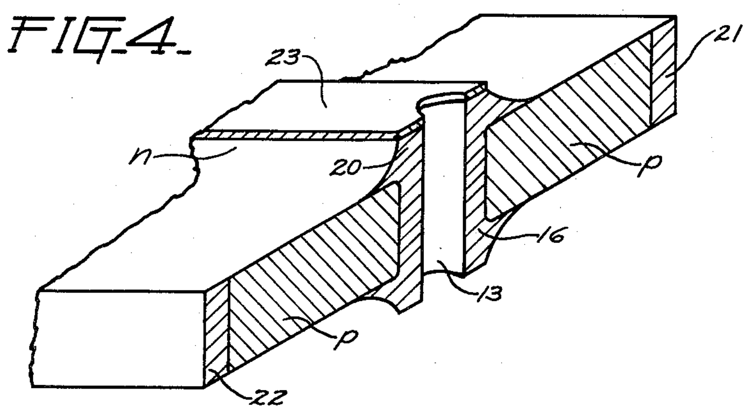
FIGURE 4 is a perspective view of one end of the device of FIGURE 3.

The wafer, FIGURE 2, is suited admirably for forming devices for high frequency operation. For example, the p-type wafer, FIGURE 1, may be subjected to a diffusion operation in which donors are diffused into the wafer. The diffusion of donors will form an n-type layer of substantially uniform depth on the surfaces of the wafer and along the surface of the holes. Subsequently the layers on the surface of the wafer may be removed by mechanical or chemical means except for a band 20 connecting the holes to leave a wafer of the type shown in FIGURES 3 and 4.

By controlling the diffusion, the layers 16 at the holes may be made to approach one another within any desired small distance W. A relatively narrow and short channel exists between the side 17 and 18 of the wafer. The length is represented by the distance L. The layers formed in the holes extend to the surfaces of the wafer. Electrical connection can be made to these layers from one or both ends. Conductive material may be introduced into the holes to make competent electrical contact along the inner exposed surface of the holes. Suitable ohmic contacts can be made to the regions 17 and 18 to form, for example, connections 21 and 22. The device may be operated as a field effect transistor in which the space charge layer in the channel is varied to control the flow of carriers from the source connection 21 to the drain connection 22. The relatively short narrow channel provides a device suitable for high frequency operation.

Figure 5:
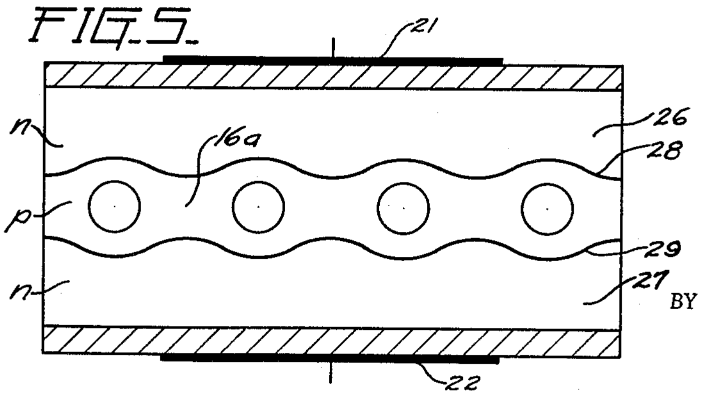
FIGURE 5 shows another semiconductive device formed from a wafer of semiconductive material formed in accordance with the present invention.

Referring to FIGURE 5, another device constructed from a wafer of material in accordance with the invention is illustrated. The device illustrated in FIGURE 5 is made from a starting block of n-type material rather than p-type to illustrate the flexibility of the process. In the device of FIGURE 5, the diffusion is controlled to produce layers 16a which join to form a continuous base layer of opposite conductivity type separating the two regions 26 and 27. Thus, emitter and collector junctions 24 and 26 are formed. The base is relatively thin providing high frequency operation; yet it is easy to make connection to the same. For example, contacts may be made to the base layer by introducing conductive material into the holes.

Crystals having boundaries with dislocations are often grown due to thermal strains. However, it is preferable to provide a controlled method for growing crystals having small angle boundaries.

Figure 6:
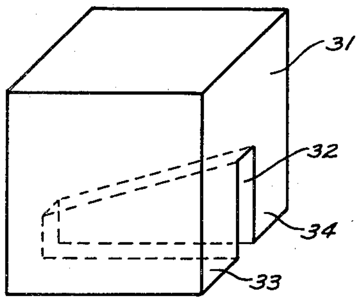
FIGURE 6 shows a seed suitable for growing a crystal including a grain boundary.

FIGURE 6 represents a single crystal seed suitable for growing a crystal including a small angle boundary. The seed 31 is cut from a perfect crystal of semiconductive material so that the various faces are properly oriented for seeding. The crystal is cut 32 so as to leave connections at relatively high and relatively low temperature points whereby a relative rotation of the two parts is produced due to thermal stress. The seed is stressed due to the temperature gradients which are set up as it is lowered into the melt. The lower portions 33 and 34 on either side of the groove are moved with respect to one another and the orientation of the lower surface is changed. When the crystal is grown a grain boundary will be formed along the region defined by the groove due to the difference in crystal orientation on the two sides of the groove.

Figure 7:
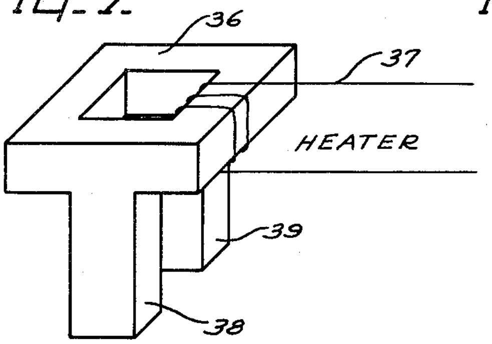
FIGURE 7 is a perspective view showing another seed structure.
Figure 8:
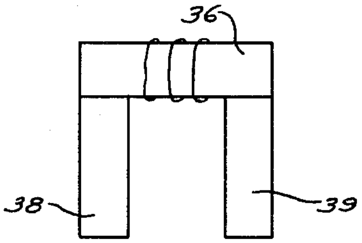
FIGURE 8 is a side elevational view of the seed of FIGURE 7.
Figure 9:
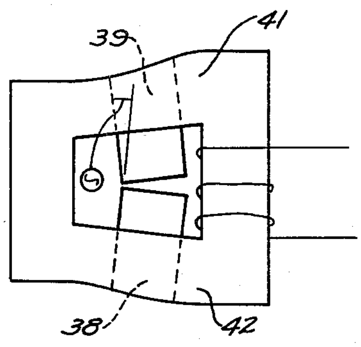
FIGURE 9 is a plan view of the seed of FIGURE 7.

FIGURES 7–9 represent another type of crystal seed structure which may be used for precise control of seed orientation. In this case, a structure is cut from a single crystal and has a region 36 in which differential expansion may be produced by a heater 37 so as to produce a controlled misorientation of the two seeds 38 and 39 which extend down from the region 36. The principle involved is illustrated clearly in FIGURE 9 which represents a plan view of the crystal. One leg of this frame is heated, causing it to expand, which results in a twisting of the two sides 41 and 42 separating the coldest part from the hottest part of the frame. From the theory of elasticity, it is possible to design frames so as to control arbitrarily small angles of misfit and thus produce grain boundaries having large spacings between the dislocations. FIGURE 9 illustrates an exaggerated case in which it is seen that the vertical seeds 38 and 39 which touch the melt are tipped through an angle represented by $\theta$ on the diagram.

Figure 10:
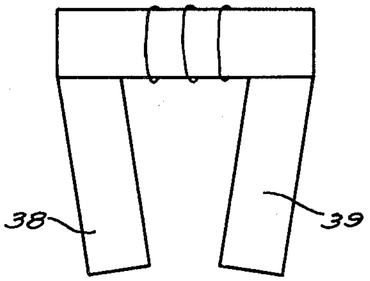
FIGURE 10 shows a modification of the seed of FIGURE 7.

FIGURE 10 represents a modification of the arrangement which brings the ends of the two seeds closer together, where they dip into the melt.

Figure 11:
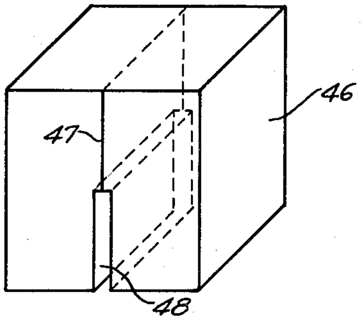
FIGURE 11 shows another seed suitable for growing a crystal including a twin boundary.

In FIGURE 11 a seed 46 is cut from a block of semiconductive material which includes a twin boundary 47. A longitudinal groove 48 may be cut along the twin boundary as previously described, or the crystal may be subjected to stresses in any of the other manners described. The grown crystal will have a misaligned twin boundary. A crystal including a misaligned twin boundary is probably more stable than one having a grain boundary. The dislocations will tend to lie along the twin boundary.

Thus, there is provided a novel wafer and method of making the same. The wafer is suitable for making high frequency devices.

I claim:

1. A method of making a junction semiconductive device which comprises the steps of forming a wafer of semiconductive material of one conductivity type having first and second spaced surfaces with a plurality of holes extending through the wafer from one surface to the other, each of said holes being surrounded by a Burgers circuit having a non-vanishing Burgers vector, diffusing, semiconductive material of opposite conductivity type into the wafer along the inside surface of said holes to form a layer of opposite conductivity type defining each of said holes, and making ohmic contact to said wafer on opposite sides of said holes and making ohmic contact to said layers.

2. A wafer of semiconductive material of one conductivity type having first and second spaced surfaces, a boundary formed in said wafer and extending from one surface to the other, a plurality of spaced holes along the boundary and extending through the wafer from one surface to the other, each of said holes surrounded by a Burgers circuit having a non-vanishing Burgers vector, and a layer of semiconductive material of opposite conductivity type surrounding said holes and forming a junction with the material of said one conductivity type.

3. A semiconductive device comprising a block of material of one conductivity type having first and second spaced surfaces, a boundary formed in said wafer and extending from one surface to the other, a plurality of spaced holes lying along the boundary and extending through the wafer from one surface to the other, each of said holes surrounded by a Burgers circuit having a non-vanishing Burgers vector, a layer of semiconductive material of opposite conductivity type surrounding said holes and forming a junction with the material of said one conductivity type, the layers of adjacent holes extending toward one another to form a channel therebetween, contacts making ohmic connections to said block on opposite sides of said boundary and a contact making ohmic contact to said layers of opposite conductivity type.

4. A semiconductive device as in claim 3 wherein the adjacent layers are contiguous.

5. A semiconductive device as in claim 3 wherein said layer of opposite conductivity type is formed by diffusion from the surface of the holes into the wafer.

6. The method of making a junction semiconductive device which comprises the steps of growing a crystal having a boundary including a plurality of spaced dislocations surrounded by a Burgers circuit having a non-vanishing Burgers vector, forming a wafer from said crystal which has first and second spaced surfaces with the boundary extending from one surface to the other, subjecting the wafer to an etchant whereby the material is preferably removed at the dislocations to form closely spaced holes extending from one surface to the other, each hole surrounded by a Burgers circuit having a non-vanishing Burgers vector, diffusing semiconductive material of opposite conductivity type into said wafer from the surface of the holes to form a layer of opposite conductivity type defining each of said holes and forming a junction with the wafer, and making ohmic contact to the wafer on opposite sides of said closely spaced holes and making ohmic contact to said layer of opposite conductivity type.

7. A semiconductive device as in claim 6 wherein adjacent layers of opposite conductivity type are contiguous.

References Cited in the file of this patent

UNITED STATES PATENTS

| | | |
|---|---|---|
| 2,705,767 | Hall | Apr. 5, 1955 |
| 2,748,041 | Leverenz | May 29, 1956 |
| 2,869,054 | Tucker | Jan. 13, 1959 |

OTHER REFERENCES

Ellis: Journal of Applied Physics, vol. 26, Number 9, 1955, pages 1140–6.

Karstensen: Journal of Electronics and Control, vol. 3, pages 305–307, September 1957.